United States Patent [19]

Fyie

[11] 3,913,544

[45] Oct. 21, 1975

[54] INDUCTION AIR TEMPERATURE CONTROL APPARATUS FOR AN INTERNAL COMBUSTION ENGINE

[75] Inventor: Vincent L. Fyie, Ferndale, Mich.

[73] Assignee: Ford Motor Company, Dearborn, Mich.

[22] Filed: Dec. 26, 1974

[21] Appl. No.: 536,699

[52] U.S. Cl. .......................... 123/122 D; 123/122 H

[51] Int. Cl.² .......................................... F02M 31/00

[58] Field of Search ......... 123/122 D, 122 H, 122 R

[56] References Cited

UNITED STATES PATENTS

| | | | |
|---|---|---|---|
| 1,219,515 | 3/1917 | Whellelsey | 123/122 H |
| 2,853,065 | 9/1958 | Stearns | 123/122 D |
| 3,444,671 | 5/1969 | Florine | 123/122 D |
| 3,744,716 | 7/1973 | Charles | 123/122 H |
| 3,830,210 | 8/1974 | Muller | 123/122 D |

*Primary Examiner*—Charles J. Myhre
*Assistant Examiner*—R. H. Lazarus
*Attorney, Agent, or Firm*—Roger E. Erickson; Keith L. Zerschling

[57] ABSTRACT

Apparatus for controlling the temperature of the induction air of an internal combustion engine. The apparatus includes a flap valve movable to vary the ratio of heated air to ambient air. The flap valve is controlled by a vacuum motor connected to a source of intake manifold vacuum. The invention includes a temperature responsive means that maintains the flap valve in a full-heat or partial heat position when the engine is cold irrespective of a sudden decay in intake manifold.

8 Claims, 4 Drawing Figures

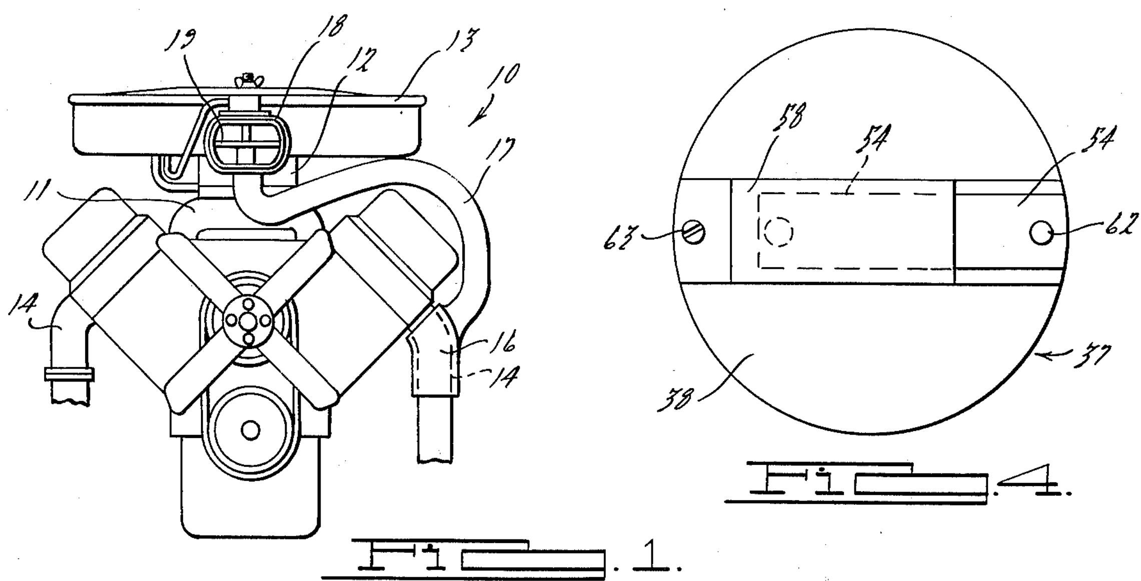
FIG. 1.
FIG. 4.
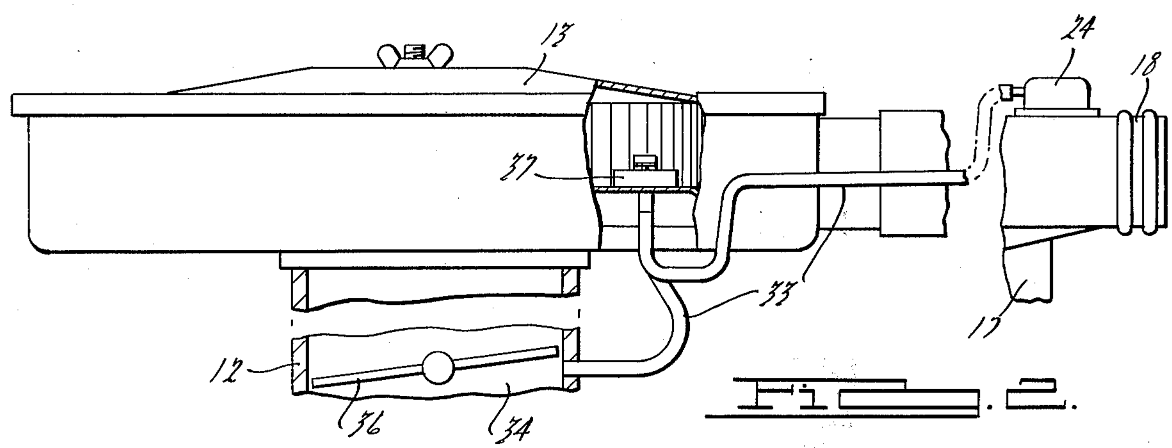
FIG. 2.
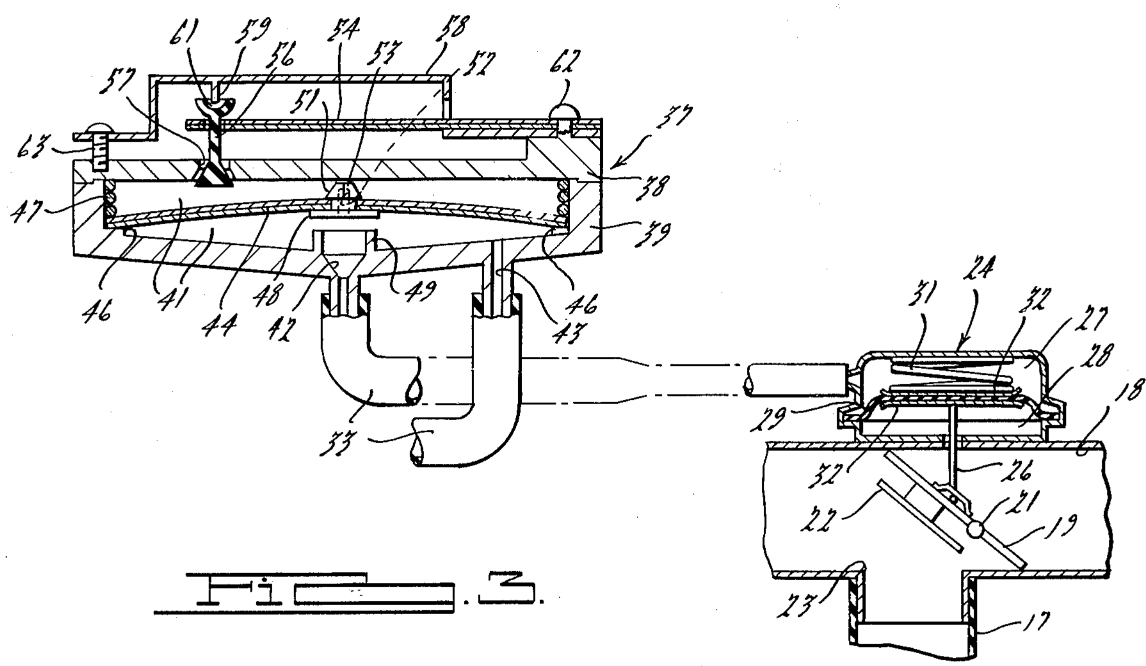
FIG. 3.

INDUCTION AIR TEMPERATURE CONTROL APPARATUS FOR AN INTERNAL COMBUSTION ENGINE

BACKGROUND AND SUMMARY OF THE INVENTION

It has long been recognized that the fuel economy of an internal combustion engine can be improved by heating the induction air provided to the carburetor during cold or warm-up operation. The heated air results in more complete vaporization of the fuel, more efficient combustion and decreased engine emissions. Heated air is generally provided by drawing the intake air over and about the exhaust manifold to utilize its heat to warm the induction air. A second air inlet is generally located to draw ambient air either from within the engine compartment or from outside of the engine compartment. In a commonly used system, a flap valve proportions the flow of heated air and cooler ambient air. The flap valve is positioned as a function of induction air temperature by a vacuum motor connected to a source of intake manifold vacuum.

It is well known in the art to provide a thermostatically controlled air bleed device in the vacuum line between the source of intake manifold vacuum and the vacuum motor that operates the flap valve. The device progressively bleeds atmospheric air into the vacuum line as the induction air warms, thereby permitting the vacuum motor to position the flap valve to provide an increasing proportion of ambient air and a decreasing proportion of heated air. One disadvantage of using the intake manifold as a source of vacuum to operate the vacuum motor is that its vacuum pressure is not constant. Consequently, a sudden acceleration that causes the magnitude of vacuum within the intake manifold to drop suddenly gives a signal to the vacuum motor similar to that received when the engine has achieved a warmed condition. The flap valve then permaturely closes the heated air duct.

This invention provides an induction air temperature control system that overcomes the problem of premature valve closing in response to a sudden engine acceleration. This invention also provides an induction air temperature control system that improves the driving performance of the vehicle and provides a more economical operation. This invention further provides improved apparatus to modulate a vacuum signal deriving from the intake manifold. More specifically, this invention provides induction air temperature control apparatus including a unitized vacuum signal modulator which is economical to produce and install and which is reliable in operation. Finally, this invention provides apparatus to apportion flow of ambient and heated air which is directly responsive to induction air temperature within the air cleaner.

Intake air temperature control apparatus constructed in accordance with this invention includes a pair of air inlet ducts of which the first duct opens to a source of ambient air and the second duct opens to a source of heated air. Each of the ducts discharges into a common induction passage leading to the engine carburetor. A flap valve is movable to open and close the first and second ducts so as to provide the carburetor with heated air or ambient air or a mixture of the two. A vacuum motor positions the flap valve to move the valve in response to an intake manifold vacuum signal.

A passage or line interconnects the vacuum motor and the source of intake manifold vacuum.

A combination temperature sensitive air bleed means and temperature sensitive valve means in positioned in the vacuum line between the vacuum motor and the source of vacuum. The air bleed means opens as a function of induction air temperature to bleed atmospheric air into the vacuum line and to reduce the magnitude of the signal to the vacuum motor. The valve means opens and closes also as a function of induction air temperature. When closed, the valve means blocks the air bleed means from the vacuum motor. A check valve is incorporated within the structure of the valve means which permits the vacuum signal to be communicated to the vacuum motor upon engine start-up .

BRIEF DESCRIPTION OF THE DRAWINGS

FIG. 1 is a front elevational view of an internal combustion engine incorporating the invention.

FIG. 2 is a side elevational view with portions broken away of an air cleaner assembly positioned upon the engine carburetor.

FIG. 3 is an enlarged cross sectional view of some of the elements of FIG. 2.

FIG. 4 is a cross sectional view taken along line 4—4 of FIG. 3.

DETAILED DESCRIPTION OF THE PREFERRED EMBODIMENT

In FIG. 1 of the drawings is an engine 10 having an intake manifold 11, a carburetor 12, an air cleaner assembly 13 positioned on the carburetor, an exhaust manifold 14 receiving burned gases from the engine combustion chambers, a heat stove 16 enclosing a portion of one of the exhaust manifolds and a flexible duct 17 interconnecting the heat stove and the air cleaner. Air is provided to the engine carburetor to the air cleaner through either an inlet 18 or the duct 17, or both. The inlet 18 draws ambient air from within or outside the engine compartment while the duct 17 draws heated air from adjacent the exhaust manifold.

FIGS. 2, 3 and 4 illustrate in greater detail the induction air temperature control apparatus. A flap valve 19 is pivotable about a rod 21 and movable from the extreme upward position shown in FIG. 3 to an extreme downward position in which the portion 22 of the valve completely blocks the outlet 23 of the hot air duct 17. The flap valve is connected to a vacuum motor 24 by link 26. The vacuum motor includes a vacuum chamber 27, an atmospheric chamber 28 and a flexible diaphragm 29 separating the two chambers. A compression coil spring 31 acts against the diaphragm reinforcements 32 urging the connecting link 26 downwardly and tending to close the heated air duct outlet 23. When the vacuum motor experiences an increase in vacuum signal, the diaphragm moves upwardly against the resistance of the coil spring and the flap valve moves toward the position, as shown in FIG. 3, in which the induction air is drawn substantially entirely through the heated air duct 17. When the vacuum signal is reduced, the force of the compressed spring urges the diaphragm downwardly so that the flap valve closes the heated air duct and provides an increased proportion of air from the ambient air inlet 18.

The vacuum motor 24 is connected by vacuum line 33 to a source of intake manifold vacuum 34 such as beneath the throttle plate 36 of the carburetor. The signal to the vacuum motor is modulated by a control device 37 forming a segment of the vacuum line 33. The control device includes a generally circular upper body element 38 and a circular lower body element 39 which together define an enclosure 41. The enclosure is connected to the vacuum motor 24 through centrally located port 42 and to the vacuum source 34 through port 43. A bimetal disc 44 is received within the enclosure and is biased at its periphery against a plurality of notches or serrations 46 by coil spring 47. The notches permit communication about the periphery of the bimetal disc. Centrally mounted on the disc is a rubber or rubber-like pad element 48 which is positioned over a cylindrical mount 49 extending upwardly from and about port 42. When the induction air temperature is below a predetermined magnitude, the center of the disc 44 snaps downwardly so that pad 48 engages the end of wall 49, closes port 42 and blocks passage 33. The pad element includes a shaft portion 51 that extends through a central opening in disc 44. The shaft portion has a hollow core 52 and a slit 53 which forms a duck-bill type check valve. The check valve permits the evacuation of atmospheric pressure from the vacuum motor upon engine start-up when port 42 is closed by pad 48.

Mounted to the upper body 38 of the control device 37 is a bimetal cantilever 54 which loosely supports a valve element 56 that is received within an orifice 57 formed in the upper body. A cap 58 covers the bimetal cantilever and includes a tab 59 which extends downwardly into a cup 61 formed in valve element 56. The cup is filled with a highly viscous substance which dampens vibrations of cantilever 54. The cap is fixed at one end to the upper body together with cantilever 54 by element 62. The other end of cap 54 is movable relative to upper body element 38 by turning the adjustment screw 63. This, in turn, adjusts the position of valve element 56 relative to orifice 57.

OPERATION

The basic function of the induction air temperature control apparatus described above is to heat the induction air during engine warm-up and to regulate its temperature during continued operation. This is accomplished by having two separate sources of induction air. The first source is the region about the exhaust manifold 14 and, consequently, the air drawn therefrom is heated to a temperature greater than that of ambient air. The second source of induction air is the ambient air surrounding either the vehicle or the engine. If the ambient air is drawn from outside the vehicle, a duct connects the inlet pipe 18 to a register (not shown) opening to the exterior of the vehicle. The flap valve 19 is movable from one extreme position to another to provide either heated air, ambient air or a mixture of both. The flap valve is positioned by a vacuum motor 24. Vacuum line 33 interconnects the vacuum chamber 29 of the vacuum motor with a source of intake manifold 34 e.g., in the carburetor or the carburetor spacer immediately beneath the throttle plate 36 as shown in FIG. 2. As the vacuum signal to the vacuum motor increases, the flexible diaphragm 29 is drawn upwardly against the force of compression spring 31 and the flap valve moves toward a full-heat position as shown in FIG. 3. Conversely, as the magnitude of the vacuum signal decreases the diaphragm moves downwardly and the flap valve moves toward a horizontal position in which only ambient air is drawn.

The magnitude of the signal to vacuum motor 24 is regulated by control device 37. At temperature below a predetermined magnitude, the air bleed orifice 57 of upper body portion 38 is closed by valve element 56. No atmospheric air is then bled into vacuum line 33 from the air cleaner 13 and the vacuum signal is at its maximum causing ambient duct 18 to close and heat duct 17 to open. As the temperature rises above the predetermined magnitude, the bimetal element 54 progressively opens the air bleed orifice 57 and the vacuum signal is reduced accordingly. As the signal decreases, the spring 31 dominates and moves the flap valve 19 from the full-heat position of FIG. 3 toward a full-ambient, horizontal position.

The bimetal disc 44 snaps upwardly to the position shown in FIG. 3 of the drawings, when the induction air temperature is above a second predetermined magnitude. In this position, ports 42 and 43 are in communication about the periphery of disc 44 with port 57. When the induction air temperature is below the second predetermined temperature, the disc 44 snaps downwardly against mouth or wall 49 and blocks port 42. When port 42 is blocked, a sudden decrease in engine intake manifold vacuum is not communicated to the vacuum motor 24. Consequently, the flap valve 19 remains in a closed or partially closed position to provide an uninterrupted flow of heated air to the carburetor until the induction air reaches the second predetermined temperature. When the disc 44 snaps open upon reaching the second predetermined temperature, the orifice 57 is just beginning to open or is about to start opening.

When the engine is started under cold conditions, the high magnitude vacuum will be communicated to the vacuum motor through the duck-bill type check valve comprised of elements 51, 52 and 53.

Modifications will occur to those skilled in the art which are included within the scope of the following claims.

I claim

1. Apparatus to regulate the intake air temperature of an internal combustion engine, said engine including an intake manifold and a carburetor in communication with said intake manifold, said apparatus including first and second air inlet conduits, said first conduit opening to a source of ambient air, said second conduit opening to a source of heated air, means communicating each said conduit with said carburetor, valve means movable to open and close said first and second conduits so as to provide said carburetor with heated air or ambient air or a mixture of heated and ambient air, a vacuum motor connected to said valve means to move said valve means in response to a vacuum signal, a vacuum passage communicating said vacuum motor and a source of intake manifold vacuum, vacuum signal modulator means including a housing forming a portion of said vacuum passage, a first thermostatic valve means positioned within said housing constructed to open and close said vacuum passage, an orifice formed in said housing communicating said vacuum passage and a source of substantially atmospheric pressure, a second thermostatic member including a valve element cooperating with said orifice to progressively open and close said orifice, said first thermostatic valve means positioned between said orifice and said vacuum motor.

2. Apparatus to control the intake air temperature of an internal combustion engine, said engine including an intake manifold, a carburetor discharging into said intake manifold, an air cleaner filtering the air to be received by said carburetor and an exhaust manifold, said apparatus including first and second conduit means to deliver air to said air cleaner, said first conduit having an inlet opening adjacent the exhaust manifold and drawing heated air from about said exhaust manifold, said second conduit having an inlet opening at a position remote from exhaust manifold, flap valve means movable to open and close said conduits, a vacuum motor connected to said flap valve means to move said valve means in response to a vacuum signal, passage means interconnecting said vacuum motor and a source of intake manifold vacuum, vacuum signal modulator means including an enclosure forming a segment of said passage means, said enclosure being positioned within said air cleaner, said modulator means including a first thermostatic valve means positioned with said housing constructed to open and close said vacuum passage, an orifice formed in said enclosure communicating said vacuum passage and the interior of said air cleaner, a second thermostatic valve means including an element cooperating with said orifice to progressively open and close said orifice, said first thermostatic valve element positioned between said second thermostatic valve means and said vacuum motor, check valve means positioned between said second thermostatic valve means and said vacuum motor.

3. Apparatus according to claim 2, said first thermostatic valve means including a bimetal disc, said first valve means closing said passage means when the induction air temperature is below a first predetermined magnitude, said second thermostatic valve means including a cantilevered bimetal, said second valve means closing said orifice when the induction air temperature is below a second predetermined magnitude, said first predetermined temperature being below said second predetermined temperature.

4. Apparatus to control the intake air temperature of an internal combustion engine, said engine including an intake manifold, a carburetor discharging into the intake manifold, an air cleaner supplying air to the carburetor and an exhaust manifold, said air cleaner including a main housing and first air intake duct in communication with a source of ambient air and discharging into said main housing, a second air intake duct drawing heated air from adjacent the exhaust manifold and discharging into said first duct, a flap valve positioned at the junction of said first and second ducts and being movable to open and close said first and second ducts and to provide said carburetor with heated air from said second duct or ambient air from said first duct or a mixture of ambient and heated air, a vacuum motor connected to said flap valve to open said flap valve in response to an increase in vacuum pressure, a vacuum line communicating said vacuum motor and a source of intake manifold vacuum, vacuum signal modulator means positioned within said air cleaner, said modulator means including a housing, a bimetal thermostatic disc received in said enclosure, said disc including a centrally positioned resilient member, a first opening formed in said housing adjacent said resilient member communicating said enclosure and said vacuum line, said resilient member closing said first opening when the induction air temperature is below a first predetermined magnitude, a second opening formed in said housing communicating said enclosure and the interior of said air cleaner, a tapered valve element received in said second opening, a bimetal cantilever mounted to said housing supporting said tapered valve element within said second opening and moving said tapered valve element relative to said opening to progressively decrease the effective restriction thereof in response to increases in induction air temperature above a second predetermined magnitude.

5. Apparatus according to claim 4, an opening formed centrally within said disc, said resilient member received within said opening, said resilient member comprising in part a duck-bill type check valve including a hollow core extending into said opening having an open end and a closed end, a slit formed in said resilient member at the closed end of said hollow core, said check valve permitting the evacuation of atmospheric pressure from said vacuum motor when said first opening is closed.

6. Apparatus according to claim 5, said vacuum modulator enclosure comprising a segment of said vacuum line, a third opening formed in said enclosure communicating said enclosure and the source of intake manifold vacuum.

7. An improvement in apparatus to control the intake air temperature of an internal combustion engine that includes an intake manifold, a carburetor discharging into said intake manifold, an air cleaner filtering the air to be received by said carburetor and an exhaust, said apparatus also including first and second conduit means to deliver air to said air cleaner, said first conduit having an inlet opening adjacent the exhaust manifold and drawing heated air from about said exhaust manifold, said second conduit having an inlet opening at a position remote from exhaust manifold, flap valve means movable to open and close said conduits, a vacuum motor connected to said flap valve means to move said valve means in response to a vacuum signal, passage means interconnecting said vacuum motor and a source of intake manifold vacuum, said improvement comprising a vacuum signal modulator received within said air cleaner, said modulator having a first body portion and a second body portion defining an enclosure therebetween, said enclosure forming a segment of said vacuum line, a bimetal thermostatic disc received within said enclosure, a central opening formed in said disc, a resilient member received within said opening, a first port formed in said first body portion adjacent said resilient member, said resilient member on said bimetal disc overlying said first port when the induction air temperature sensed by the bimetal disc falls below a first predetermined magnitude, said first port being in communication with said vacuum motor, a second port formed in said first body portion adjacent said first port, said second port communicating said enclosure and the source of intake manifold vacuum, an orifice formed in the second body portion, tapered valve element received in said orifice and movable relative thereto to progressively open and close said orifice, said orifice opening to the interior of said air cleaner, passage means about the periphery of said disc communicating said second port and said orifice, a bimetal thermostatic cantilever mounted on the exterior of said second body portion supporting and positioning said tapered valve element within said orifice, said tapered valve element closing said orifice when the induction air temperatures sensed by said bimetal cantilever is below said second predetermined temperature.

8. Apparatus according to claim 7, said resilient member comprising in part a duck-bill type check valve having a hollow core extending into said opening of said bimetal disc, said hollow core having an open end and a closed end, a slit formed in said resilient member at the closed end of said hollow core, said check valve, said check valve permitting the evacuation of atmospheric pressure from said vacuum motor when said first opening is closed.

* * * * *